3,813,441
PROCESS FOR THE CONTINUOUS PREPARATION OF QUATERNARY AMMONIUM COMPOUNDS

Gunther Müller-Schiedmayer, Burghausen (Salzach), Heinz Müller and Herbert Hubner, Burgkirchen (Alz), and Klaus Ulm, Burghausen (Salzach), Germany, assignors to Farbwerke Hoechst Aktiengesellschaft vormals Meister Lucius & Bruning, Frankfurt am Main, Germany
No Drawing. Filed Feb. 19, 1970, Ser. No. 12,846
Claims priority, application Germany, Feb. 25, 1969, P 19 09 275.2
Int. Cl. C07c 87/30
U.S. Cl. 260—567.6                9 Claims

ABSTRACT OF THE DISCLOSURE

Quaternary ammonium chlorides of amines having at least one long aliphatic chain are obtained by reacting continuously said amines with methyl chloride in the presence of an alkali metal hydroxide as acid-binding agent while maintaining a methyl chloride partial pressure of about 3 to 10 atmg., using a reaction medium consisting of final product and a lower alkanol.

---

The present invention relates to an improved process for the preparation of known ammonium salts of long-chain aliphatic amines. More specifically it relates to a continuous process for the manufacture of quaternary ammonium chlorides containing at least one aliphatic group of 8 to 22 carbon atoms.

Subject matter of the present invention is, especially, a process for the continuous manufacture of quaternary ammonium compounds corresponding to the formula

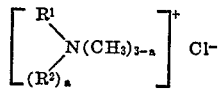

wherein $R^1$ stands for an aliphatic radical having from 8 to 22 carbon atoms, $R^2$ represents an aliphatic radical of 1 to 22, preferably 8-22 carbon atoms and $a$ is 0 or 1, by reacting an amine of the formula

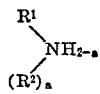

wherein $R^1$ and $R^2$ are as defined above, with methyl chloride under pressure in the presence of alkalies, which comprises reacting said amine and methyl chloride, continuously, with 2-a mols of alkali hydroxide, at a temperature of about 50° to about 90° C., preferably about 60 to 70° C., in a reaction medium consisting of the final product and a low-boiling alcohol, preferably alcohols of 1 to 4 carbon atoms, in particular isopropanol, while maintaining a methyl chloride partial pressure of about 3 to about 10, preferably about 4 to about 6 atmg. and, advantageously, withdrawing continuously from the reaction vessel the so-formed quaternary ammonium compounds having a degree of quaternation of at least 98%.

It has been known for many years to produce quaternary ammonium compounds of the type R'N(R")₃X or (R')₂N(R")₂X wherein R' represents a long-chain alkyl radical, R" is a methyl group and X the ion of a halide, preferably of chlorine, from long-chain primary or secondary aliphatic amines by reacting those amines with an alkyl halide according to the following reaction equations

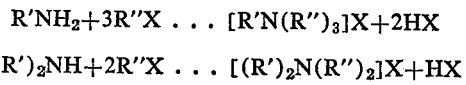

In the said reactions one or two mols of acid are formed which would produce an amine salt with the unreacted free amine and block the amine for further reaction. In order to achieve a complete conversion of the amine to the quaternary ammonium compound, the acid produced must be bound by an alkali. As alkalies, for the purpose, preferably alkali hydroxide in aqueous solution at a concentration between 50 and 75% and also solid sodium bicarbonate are employed.

Unto the present, in order to produce the quaternary ammonium compounds from long-chain primary or secondary amines and methyl chloride, a long-chain aliphatic amine, a low-boiling alcohol as solvent and sodium bicarbonate or sodium hydroxide solution were charged into a closed reaction vessel and were, subsequently, treated with methyl chloride, preferably with thorough agitation under elevated pressure at temperatures of from 60-80° C. until the desired reaction pressure was attained and quaternization completed.

In order to counter-balance the amount of alkali necessary to bind the free acid produced according to the reaction equation, sodium hydroxide solution was still added. Since the reaction takes a slow course under normal pressure, to accelerate its procedure, it was effected under elevated pressure to obtain a higher concentration of methyl chloride in the reaction mixture.

On completion of the reaction, the pressure in the reaction vessel had to be released and the excessive methyl chloride be either expelled or recovered with the aid of a reflux condenser. For achieving a degree of quaternization of 98-99% on an industrial scale, the reaction generally required 16-24 hours.

The disadvantage of conducting the reaction as described resides in the rapid saponification of the methyl chloride occurring with a strong alkali, especially when the alkali is present in excess at the beginning of the reaction. This causes considerable losses and, at the same time, gives rise to the formation of salts of the inorganic base. Moreover, the increased content of water brought about by the amount of sodium hydroxide solution needed in addition results in a substantial increase of the salt content of the final products. The amount of methyl chloride saponified is directly proportional to the period of reaction. It is true that this period is reduced by a higher concentration of methyl chloride in the reaction vessel, however, the compulsory addition of a stoichiometric amount of sodium hydroxide solution favors the saponification of the methyl chloride.

According to German Patent Specification 1,210,869 a substantial reduction of the period of reaction with addition of stoichiometric amounts of methyl chloride and sodium hydroxide solution can also be reached by introducing into the reaction mixture, prior to the addition, solid sodium bicarbonate, whereby a substantially lower pH value can be maintained and the hydrolysis of the methyl chloride be reduced. A disadvantage of said mode of carrying out the reaction is that, caused by the sodium bicarbonate added for binding the hydrochloric acid formed in the reaction, one mol of gaseous carbon dioxide is produced for each mol of acid. The increase in pressure which thus results makes necessary the venting of the reaction vessel several times during the reaction which, of course, causes loss in methyl chloride unless recovery thereof is ensured in a separate vessel. Besides such losses, the color of the product changes due to the long periods of contact with the alkalies which essentially impairs its quality for nearly all uses.

The known method of U.S. Patent Specification 2,950,318 requires a discontinuous procedure, for, first, the long-chain primary or secondary amine to be quaternized has to be admitted into the vessel and, subsequently, be reacted with methyl chloride. The amount of sodium hydroxide solution required to bind the acid produced can either be introduced along with the amine or, respectively, be added with the methyl chloride. However, the discontinuous mode of operation is incompatible with a rational production of quaternary ammonium compounds, since the time expenditure for filling, heating and venting the reaction vessel prevents an optimum utilization of the available reaction space. Moreover, the loss in methyl chloride resulting from its saponification and from the repeated venting of the reaction vessel is a great burden to the economy of the process.

Now, it has been found that quaternized aliphatic ammonium compounds can be produced in an advantageous manner from aliphatic amines having a long, straight or branched chain, when quaternization is effected in the presence of the corresponding quaternary ammonium compound, using, simultaneously, a low-boiling solvent. The quaternary ammonium compound to be produced is charged into the vessel along with a low-boiling alcohol. Subsequently, the corresponding amine and an aqueous solution of an alkali hydroxide, preferably sodium hydroxide (a 50–75% solution thereof) are added in stoichiometric proportions, between about 50 and 80° C., at a methyl chloride partial pressure of about 5 to about 10 atmg., whereby the amine is instantly converted to the quaternary ammonium compound with a yield amounting to 98% calculated on the amine employed. In order to maintain the concentration of the quaternary salt constant in the course of the reaction, an additional amount of solvent can be added.

Said mode of conducting the reaction enables a continuous and hence particularly advantageous operation in which the long-chain amine and the required sodium hydroxide solution are added at a constant methyl chloride partial pressure and the quaternary ammonium compound is, continuously, withdrawn from the reaction vessel together with the sodium chloride formed simultaneously, with no need for release of pressure in the reaction vessel and without attendant loss in methyl cholride. Subsequently, the quaternary ammonium compound is freed from the admixed sodium chloride by filtration.

Another advantageous alternative of executing the process of the invention consists in arranging the reaction vessel in the form of a cascade and achieving by maintenance of a constant methyl chloride partial pressure over the whole of the cascade, in the individual steps, for the long-chain aliphatic amine used, a degree of conversion increasing in the flow direction of the product. In the two-step cascade the first reaction step is preferably performed unto a degree of quaternization of about 75 to about 85%, while the second step is carried out until a desired ultimate value of at least 98%, is reached. The amount of unreacted amine and of aminohydrochloride present in the reaction product as impurities is thus less than 2%.

The production of quaternary ammonium compounds by a continuous process as enabled by the present invention permits to far more economically utilize the reaction space than was possible with the known discontinuous processes. The dwelling time in the reaction vessel can be reduced to about 4–5 hours while for the discontinuous process about 10–24 hours are required. In addition, the avoidance of standstill intervals due to filling, heating and venting of the reaction vessel taking up about 25–30% of the reaction period required permits a substantial increase in production. It was a surprising finding that with the reaction carried out in the presence of excess amounts of quaternary ammonium compounds i.e. at least 50% by weight, the saponification of the methyl chloride was practically avoided. Thus it became possible to use alkali hydroxides in place of sodium bicarbonate and thereby shorten the reaction time which helps to considerably improve the color of the quaternary ammonium compounds.

As amines above all primary or secondary aliphatic amines containing in the chain at least one aliphatic radical of 8–22 carbon atoms are employed, e.g. octylamine, decylamine, stearylamine, oleylamine, dioctylamine, didecylamine, distearylamine, moreover, amines having different lengths of chain of a statistical proportion as obtained by hydrogenation of fatty acid nitriles produced from natural fatty acids.

As solvents to be used for the quaternary ammonium compounds and for further diluting the reaction medium alcohols containing from 1 to 4 carbon atoms, preferably isopropanol, are suitable.

The following Examples serves to illustrate the invention. The parts and percentages are by weight unless otherwise stated.

EXAMPLE 1

In a pressure reactor, while stirring and cooling and maintaining constant a methyl chloride partial pressure of 5 atm., at 75–80° C., 655 kg./h. of distearyl amine and 104 kg./h. of 50% sodium hydroxide solution, were continuously charged to a mixture of 5000 kg. of 75% distearyl-dimethyl-ammonium chloride (resulting from the reaction of distearyl amine and methyl chloride with sodium hydroxide solution), and 25% isopropanol/water (of the ratio 18:7 parts by volume). In order to maintain a concentration of active substance of 75%, 185 kg./h. of isopropanol were added. The quaternary ammonium compound produced and the simultaneously formed sodium chloride suspended therein were continuously withdrawn from the reactor. The degree of conversion amounted to 98.0–98.5% calculated on the distearyl amine employed. The remaining 1.5–2% consisted of free amine and aminohydrochloride. After the sodium chloride had been separated and the adhering product extracted, 985 kg./h. of a mixture of 75% strength of di-methyl-distearyl ammonium chloride and isopropanol/water was obtained.

The space/time yield amounted to 143 kg./m.$^3$/h.

The distearylamine used resulting from catalytic hydrogenation of nitriles produced from natural tallow fatty acid contained about 2.5% of primary, 90% of secondary and 7.5% of tertiary amines. The proportion of chains was the same as in natural fatty acids (in substance alkyl radicals, about 50% thereof having 14, and about 50% 16 carbon atoms).

The methyl chloride partial pressure in the reactor was kept at the desired level by adding continuously methyl chloride. 131 kg./h. of methyl chloride were consumed.

EXAMPLE 2

The first one of two pressure reactors formed as a cascade was charged, while maintaining a methyl chloride partial pressure of 5.0 atmg., with distearylamine, isopropanol and 50% sodium hydroxide solution, whereby the amine introduced prior thereto was converted by 70–80% to quaternary ammonium compound. To said reaction mixture 638 kg./h. of distearyl amine and 90 kg./h. of 50% sodium hydroxide solution were continuously added at 70–75° C., while maintaining a methyl chloride partial pressure of 5.0 atmg. In order to keep up a constant concentration of active substance, the whole was diluted with 170 kg./h. of isopropanol. The product obtained with a degree of conversion to quaternary ammonium compound of, at least, 75% calculated on the amine employed and a remnant comprising distearylamine, methyl distearylamine and aminohydrochloride was continuously charged, at 70–75° C., into a second pressure reactor, series-connected after the first while maintaining the same methyl chloride partial pressure. Thereby a degree of conversion to quaternary ammonium compound of at least 98% calculated on the amine used was achieved. The remnant portions of amine consisted of free amine and aminohydrochloride. To neutralize the hydrochloric acid, 12 kg./h. of 50% sodium hydroxide solution were added. The reaction product was continuously withdrawn from the reactor. After the sodium chloride had been separated and the product extracted, 960 kg./h. of a 75% solution of distearyl-dimethyl-ammonium chloride in isopropanol/water were obtained. The space/time yield amounted to 164 kg./m.³/h. The distearyl amine employed was the same as used in Example 1. To maintain the methyl chloride partial pressure constant, in total 128 kg./h. of methyl chloride were charged into the reaction vessel.

EXAMPLE 3

In the reaction system described in Example 2, formed as a cascade, 620 kg./h. of di(tallow fatty acid) amine and 71 kg./h. of 70% sodium hydroxide solution were analogously reacted at 75–80°C. while maintaining constant a methyl chloride partial pressure of 4.5 atmg. To keep up a constant concentration of active substance the whole was, furthermore, diluted with 187 kg./h. of isopropanol. The degree of conversion to quaternary ammonium compound was in the first reactor 75–80%, while in the second, series-connected reactor, at least a 98% conversion calculated on the amine employed was achieved. The remaining portion comprised free amine and aminohydrochloride.

After the sodium chloride formed along with the product had been separated and the product extracted, 930 kg./h. of the quaternary ammonium compound produced were continuously withdrawn as a 75% solution in isopropanol/water. For the reaction and for maintaining constant the methyl chloride partial pressure, 124 kg./h. of methyl chloride were consumed.

The space/time yield amounted to 165 kg./m.³/h.

The di(tallow fatty acid) amine used was obtained by catalytic hydrogenation of nitriles produced from natural tallow fatty acid. The proportion of chains in said amine corresponded to that of natural fatty acid (about 65% of alkyl radicals, about 5% of which containing 14, about 30% 16 or 18 carbon atoms and 35% of oleyl radicals). The di(tallow fatty acid) amine used comprised about 4% of primary, 85% of secondary and 11% of tertiary amines.

EXAMPLE 4

In a reaction system as described in Example 2, formed as a cascade, 515 kg./h. of di(coconut oil) amine and 114 kg./h. of 50% sodium hydroxide solution were reacted in an analogous manner at a temperature of 70–75° C., while maintaining a methyl chloride partial pressure of 4 atm. In order to keep up the desired concentration of active substance, the whole was diluted with 119 kg./h. of isopropanol. The conversion to quaternary ammonium compound was in the first reactor 75%, while in the second at least 98% were achieved. The remnant portion of amines consisted of free amine and aminohydrochloride. After the sodium chloride formed had been separated and the product extracted, 804 kg./h. of quaternary ammonium compound were obtained as a 75% solution in isopropanol/water. For maintaining a constant methyl chloride partial pressure, 141 kg./h. of methyl chloride were consumed.

The space/time yield amounted to 158 kg./m.³/h.

The di(coconut oil) amine employed was obtained by catalytic hydrogenation of nitriles produced from natural coconut oil acid. The proportion of chains in said amine corresponded to that of natural coconut oil acid (substantially alkyl radicals, about 50% of which having 12, the remainder 8–18 carbon atoms). The composition of the di(coconut oil) amine was as follows: 8% of primary, 86% of secondary, and 6% of tertiary amines.

EXAMPLE 5

At the bottom of a vertical, oblong pressure reactor, equipped with an agitator and a cooling device, 362 kg./h. of a primary soybean oil amine were continuously charged to a 50% solution of trimethyl-soybean-oil-ammonium chloride in isopropanol/water at a methyl chloride partial pressure of 4 atmg. The reaction temperature was 75–80° C. To neutralize the produced hydrochloric acid, 154 kg./h. of sodium hydroxide solution (of 72% strength) were continuously added. To maintain the concentration of active substance, the whole was continuously diluted with 374 kg./h. of isopropanol. The quaternary ammonium compound produced and the simultaneously formed sodium chloride were continuously withdrawn from the reactor via an appropriate venting system. The degree of conversion amounted to 98.0–98.5% calculated on the amine employed; the remaining portion consisted of free amine and aminohydrochloride. After the sodium chloride had been separated and the product extracted, 934 kg./h. of quaternary ammonium compound were obtained as a 50% solution of isopropanol/water.

The space/time yield was 134 kg./m.³/h.

In order to keep up the methyl chloride partial pressure, 208 kg./h. of methyl cholride were introduced under pressure. The proportion of chains in the primary soybean oil amine corresponded to that of natural soybean oil acid, that is to say: 15% of alkyl radicals, about 55% of oleyl radicals, about 20% of radicals with a double-unsaturated and about 5% of radicals having a three-fold unsaturated bond, substantially containing 18 carbons atoms each.

EXAMPLE 6

In the pressure reactor described in Example 5, while maintaining a methyl chloride partial pressure of 6.0 atmospheres, 284 kg./h. of a β-branched pentadecyl amine were continuously reacted with methyl chloride in a solution of trimethyl - (β - branched)-pentadecyl-ammonium chloride in isopropanol/water. The reaction temperature was 85–90° C. To neutralize the hydrochloric acid produced, 125 kg./h. of sodium hydroxide solution were continuously added. The 50% concentration of active substance was maintained by addition of 257 kg./h. of isopropanol. The consumption in methyl chloride amounted to 168 kg./h.

After the sodium chloride formed had been separated and extracted, 664 kg./h. of quaternary ammonium compound were obtained as a 50% solution in isopropanol/water. The degree of conversion was 98.0–98.5% calculated on the employed amine, the remnant consisted of free amine and aminohydrochloride.

The space/time yield was 95 kg./m.³/h.

The β-branched pentadecylamine employed as obtained by reaction of a synthetic alcohol having 15 carbon atoms and ammonia.

We claim:

1. A continuous process for the manufacture of a quaternary ammonium chloride of the formula

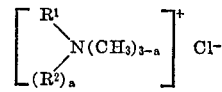

in which $R^1$ is an aliphatic hydrocarbon group of 8 to 22 carbon atoms, $R^2$ is an aliphatic hydrocarbon group of 1 to 22 carbon atoms, and $a$ is 0 or 1, comprising continuously introducing an amine of the formula

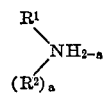

in which $R^1$, $R^2$ and $a$ are as given above and an aqueous solution of an alkali metal hydroxide in stoichiometric proportions, together with a lower alkanol at between 50 and 80° C. and under a methyl chloride pressure of about 3 to 10 atmg. into a reaction vessel containing already formed reaction mixture, while stirring, continuously withdrawing the liquid reaction mixture and sodium chloride formed from the reaction vessel without release of the methyl chloride pressure, the dwelling time in the reaction vessel being about 4 to 5 hours and the alkanol being added at a rate such that the concentration of the quaternary product in the reaction medium is maintained at least 50% by weight.

2. The process as claimed in claim 1, wherein $R^1$ is alkyl or alkenyl of 8 to 22 carbon atoms each.

3. The process as claimed in claim 1, wherein $R^2$ is alkyl or alkenyl of 1 to 22 carbon atoms.

4. The process as claimed in claim 1, wherein $R^2$ is alkyl or alkenyl of 8 to 22 carbon atoms.

5. The process as claimed in claim 1, wherein the temperature is in the range of about 60° to 70° C.

6. The process as claimed in claim 1, wherein the methyl chloride partial pressure is in the range of about 4 to 6 atmg.

7. The process as claimed in claim 1, wherein the lower alkanol is isopropanol.

8. The process as claimed in claim 1, wherein the reaction is performed until a degree of quaternization of 98% is reached.

9. A continuous process for the manufacture of a quaternary ammonium chloride of the formula

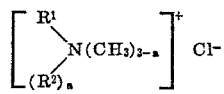

in which $R^1$ is an aliphatic hydrocarbon group of 8 to 22 carbon atoms, $R^2$ is an aliphatic hydrocarbon group of 1 to 22 carbon atoms and $a$ is 0 or 1, comprising continuously introducing an amine of the formula

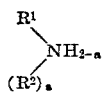

in which $R^1$, $R^2$ and $a$ are as given above, and an aqueous solution of an alkali metal hydroxide in stoichiometric proportions, together with a lower alkanol at between 50° and 80° C. and under a methyl chloride pressure of about 3 to 10 atmg. into a two step cascade reaction zone, containing already formed reaction mixture, wherein in the first part thereof, the amine, the alkali metal hydroxide and the methyl chloride are reacted to about 70% to about 85% conversion, while stirring, and in the second part of the cascade to about 98% conversion, while stirring, while maintaining in the whole system the same methyl chloride partial pressure, continuously withdrawing the liquid reaction mixture and sodium chloride formed from the reaction zone, the alkanol being added at a rate such that the concentration of the quaternary product in the reaction medium is maintained at at least 50% by weight.

References Cited

UNITED STATES PATENTS 2,950,318   8/1960   Shapiro _____ 260—567.6 M

FOREIGN PATENTS

23924/68   10/1968   Japan _____ 260—585 A

LEON ZITVER, Primary Examiner

M. W. GLYNN, Assistant Examiner